US009285141B2

(12) United States Patent
Aigouy et al.

(10) Patent No.: US 9,285,141 B2
(45) Date of Patent: Mar. 15, 2016

(54) METHOD AND EQUIPMENT FOR PULSED CHARGE COOLING OF A COMPONENT OF A TOKOMAK

(75) Inventors: Gerald Aigouy, La Croix de la Rochette (FR); Jean-Marc Bernhardt, La Buisse (FR); Pierre Briend, Seyssinet (FR); Eric Fauve, Bollene (FR); David Grillot, Rives (FR); Vincent Heloin, Sassenage (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 663 days.

(21) Appl. No.: 13/634,402

(22) PCT Filed: Feb. 28, 2011

(86) PCT No.: PCT/FR2011/050407
§ 371 (c)(1),
(2), (4) Date: Sep. 12, 2012

(87) PCT Pub. No.: WO2011/110768
PCT Pub. Date: Sep. 15, 2011

(65) Prior Publication Data
US 2013/0000332 A1 Jan. 3, 2013

(30) Foreign Application Priority Data
Mar. 12, 2010 (FR) ...................................... 10 51784

(51) Int. Cl.
F25B 9/00 (2006.01)
F25B 9/14 (2006.01)
(Continued)

(52) U.S. Cl.
CPC ...... *F25B 9/00* (2013.01); *F25B 9/06* (2013.01); *F25B 9/14* (2013.01); *F25B 2400/24* (2013.01); *H01F 6/04* (2013.01); *H02K 9/10* (2013.01); *H02K 55/00* (2013.01)

(58) Field of Classification Search
CPC ............... F25B 9/00; F25B 9/06; F25B 9/14; F25B 2400/24; H01F 6/04; H02K 9/00; H02K 9/10; H02K 55/00
See application file for complete search history.

(56) References Cited

U.S. PATENT DOCUMENTS 4,884,409 A * 12/1989 Quack et al. ................... 62/51.1

FOREIGN PATENT DOCUMENTS

WO WO2009024705 2/2009

OTHER PUBLICATIONS

International Search Report for PCT/FR2011/050407, mailed Apr. 29, 2011.

(Continued)

Primary Examiner — Jonathan Bradford
(74) Attorney, Agent, or Firm — Christopher J. Cronin

(57) ABSTRACT

The invention relates to a method and device for pulsed charge cooling of a component of a Tokamak. The method uses a refrigeration device that subjects a working fluid such as helium to a work cycle including: compression, cooling, and decompression, as well as heat exchange with the member and heating. The refrigeration power produced by the refrigeration device is increased to a relatively high level when the Tokamak is in a plasma generation phase and is decreased to a relatively low level when the Tokamak is no longer in a plasma generation phase. The increase in refrigeration power produced by the refrigeration device is automatically triggered in response to a signal produced during a step for starting plasma in the Tokamak.

7 Claims, 3 Drawing Sheets

(51) Int. Cl.
  *H02K 55/00* (2006.01)
  *H02K 9/10* (2006.01)
  *F25B 9/06* (2006.01)
  *H01F 6/04* (2006.01)

(56) References Cited

OTHER PUBLICATIONS

French Search Report for FR1051784, mailed Nov. 12, 2010.
Briend, P., et al., "Dynamic Simulation of a Large Scale Pulsed Load Helium Refrigerator," Advances in Cryogenic Engineering: Transactions of the Cryogenic Engineering Conference—CEC, American Institute of Physics, US, vol. 55, Apr. 9, 2010, pp. 1453-1459.
Briend, P., et al., "Dynamic Simulation of a Large Scale and Pulsed Load Helium Refrigerator," Internet Citation, Jul. 1, 2009, p. 1.
Claudet, G., et al, "Design of the ITER-FEAT Cryoplant to Achieve Stable Operation Over a Wide Range of Experimental Parameters and Operation Scenarios," Fusion Engineering and Design, Elsevier Science Publishers, vol. 58-59, Nov. 1, 2001, pp. 205-209.
Dauguet, P., et al, "Using Dynamic Simulation to Support Helium Refrigerator Process Engineering," 100 Years of Liquid Helium: Proceedings of the Twenty-Second International Cryogenic Engineering Conference and International Cryogenic Materials Conference 2008, ICEC 22—ICMC 1008; Seoul, Korea, Jul. 21-25, 2008, KR, Jan. 1, 2009, pp. 39-44.
Kalinin, V., et al., "ITER Cryogenic System," Fusion Engineering and Design, Elsevier Science Publishers, vol. 81, No. 23-24, Nov. 1, 2006, pp. 2589-2595.

* cited by examiner

METHOD AND EQUIPMENT FOR PULSED CHARGE COOLING OF A COMPONENT OF A TOKOMAK

CROSS-REFERENCE TO RELATED APPLICATIONS

This application is a §371 of International PCT Application PCT/FR2011/050407, filed Feb. 28, 2011, which claims §119(a) foreign priority to French patent application FR1051784, filed Mar. 12, 2010.

BACKGROUND

1. Field of the Invention

The present invention relates to a pulsed load cooling method and refrigerator.

The invention in particular relates to a pulsed load method for cooling a component of a "Tokamak", i.e. a component of an installation for intermittently generating a plasma, the method employing a cooling device that subjects a working fluid such as helium to a working cycle comprising: compression; cooling and expansion; heat exchange with the component; and heating, the cooling power produced by the cooling device being increased to a relatively high level when the Tokamak is in a plasma generation phase whereas the cooling power produced by the cooling device is reduced to a relatively low level when the Tokamak is no longer in a plasma generation phase.

The invention more particularly relates to a pulsed load cooling method and refrigerator for cooling a component of a Tokamak, i.e. a component of an installation for intermittently generating a plasma.

2. Related Art

A Tokamak (Russian acronym for "Toroidalnaya Kamera c Magnitnymi Katushkami") is an installation capable of producing the physical conditions necessary for obtaining fusion power. In particular, a Tokamak intermittently produces plasma, i.e. ionized gas that conducts electricity.

The cooling requirements of Tokamaks depend on their highly transitory operating state. A Tokamak produces plasma in discontinuous, repeated bursts. The plasmas are generated cyclically at regular intervals or else randomly, on request.

This operating mode requires what is called "pulse load" cooling, i.e. very substantial cooling power is required for a very short amount of time (during the plasma generation phase), this high cooling demand being followed by a longer period (until the next plasma is generated) during which there is little need for cooling.

Tokamak refrigerators are therefore designed to meet the requirements of this operating mode. Thus, these refrigerators employ what is called an "economizer" mode, producing liquid helium in the periods between plasmas. The liquid helium produced is stored in a reserve that will be consumed by boiling to cool a component of the Tokamak during plasma generation phases.

When the period between two plasmas is sufficiently long, the maximum filling level of the liquid helium reserve is reached before the following plasma. The cooling power of the refrigerator may then be reduced, thereby saving a substantial amount of power. In a conventional solution, the power of the refrigerator is minimized by reducing the pressures of the cycle (i.e. by reducing the pressure level of the compression of the helium in its working cycle). The power of the refrigerator may also be decreased or increased by changing the cycle flow rate when a frequency variator is used (i.e. the flow rate of helium through the working cycle is selectively decreased or increased).

A heater is generally provided in the liquid helium reserve. This heater is activated in order to consume excess cooling power, so as to keep the liquid level constant or at least below a maximum threshold.

Conventionally, the transition between power regimes (increase or decrease in the cooling power produced) is requested depending on the activation power of the heater, i.e. the electric control signal of the heater is interpreted using a "heating curve" that defines the pressure setpoint of the cycle and/or the frequency setpoint of the variator of the compressing station of the refrigerator.

When a new plasma is generated, the refrigerator is made to produce a maximum refrigeration power either manually (by an operator), or as a function of the "heating curve" of the heater.

When the plasma has been extinguished and the cooling power required is lower, the return of the refrigerator to a regime producing less cooling power is generally achieved automatically, when no power is being supplied to the heater.

Document WO 2009/02740512 describes a method for regulating the cryogenic power delivered to a consumer by a refrigerator, based on the cooling power produced by the refrigerator.

Although these operating modes are satisfactory overall, the power consumption of the refrigerator remains high.

SUMMARY OF THE INVENTION

One aim of the present invention is to mitigate all or some of the drawbacks of the prior art touched upon above. In particular, the aim of the present invention is to provide a cooling method and a refrigerator that are better than those of the prior art.

To this end, the method for cooling a component of a Tokamak, according to the invention, and moreover according to the generic definition thereof given above in the preamble, is essentially characterized in that the increase in the cooling power produced by the cooling device is automatically triggered in response to a signal generated during a step of starting a plasma in the Tokamak.

The invention thus allows the cooling power of the refrigerator to be automatically regulated, minimizing liquid helium consumption. As will be described below, the invention allows the overall power consumption of the refrigerator to be reduced. The invention especially allows the length of the period of use of the refrigerator at its maximum cooling power to be reduced.

This may be obtained according to the invention by anticipating the generation of a plasma, before the helium reserve is affected.

Moreover, embodiments of the invention may comprise one or more of the following features:

- the signal is generated when there is a predetermined modification of a physical parameter that can be observed in the Tokamak;
- the signal is generated when there is a predetermined modification of at least one of the following physical parameters: a predetermined increase in the internal temperature of the Tokamak; a manual or automatic control signal for switching the Tokamak to a plasma generation phase; an electrical signal associated with a pressure and/or electrical current and/or voltage and/or magnetic field measurement; or a signal delivered by an optical measuring instrument such as a camera or one or more optical fibers;

when the Tokamak is no longer in a plasma generation phase, the method comprises at least one period during which the cooling device liquefies working fluid and stores the liquefied fluid in a buffer reserve, the level of the liquefied fluid in the reserve being kept below a threshold by way of a heater that can be selectively activated, and, when a plasma phase is initiated, the cooling power produced by the cooling device is increased before the heater is deactivated and before the level of liquid in the reserve decreases, i.e. the signal indicating that a plasma is being struck in the Tokamak precedes deactivation of the heater and the drop in the level of liquid in the reserve resulting from fluid vaporization due to cooling of the component of the Tokamak during plasma generation;

the decrease in the cooling power produced by the cooling device to a low level is automatically triggered in response to a predetermined variation in the thermal load on the component, i.e. a predetermined variation in the cooling requirement of the component; and the decrease in the cooling power produced by the cooling device is automatically triggered in response to at least one of: a signal indicating a predetermined temperature decrease in a fluid circuit ensuring heat exchange between the component and the working fluid; an increase in the level of liquid helium in a storage tank; an opening threshold of a cold bypass; and/or a threshold speed of a cold compressor or turbine.

The invention may also relate to a pulsed load refrigerator for cooling a component of a Tokamak, the refrigerator being equipped with a cooling device comprising a circuit forming a working cycle of a working fluid such as helium, the circuit of the cooling device comprising:

a station for compressing the working gas, the station being equipped with at least one compressor;

a precooling/cooling unit comprising at least one heat exchanger and at least one component for expanding the working gas output from the compressing station;

a system for exchanging heat between the cooled working fluid and the component; and a system for returning fluid that has exchanged heat with the component to the compressing station, the refrigerator comprising electronic logic for controlling the cooling device ensuring regulation of the cooling power produced by said cooling device, in order for this cooling power to be rapidly increased to a relatively high level when the Tokamak is in a plasma generation phase, the refrigerator being characterized in that the Tokamak comprises an emitter that emits a triggering signal each time a plasma is being started, the electronic logic comprising a receiver that receives said triggering signal so as to automatically command the increase in the cooling power produced by the cooling device on reception of this signal.

Moreover, embodiments of the invention may comprise one or more of the following features:

the refrigerator comprises a sensor that measures the value of a physical parameter that can be observed in the Tokamak and that indicates whether a plasma is being struck, and in that said sensor delivers a signal to the emitter with a view to providing the electronic control logic with input;

the sensor comprises at least one of: a sensor sensing the internal or external temperature of the Tokamak; a switching sensor for sensing the manual or automatic command requesting the Tokamak switch from what is called a "standby" phase into a plasma generation phase; or any other electrical sensor present in the instrumentation of the Tokamak;

the precooling/cooling unit comprises a buffer reserve of fluid liquefied during the working cycle, a heater that can be selectively activated so as to vaporize some of the liquefied fluid of the reserve, a circuit for selectively exchanging heat between the fluid of the reserve and the component, the refrigerator comprising a sensor measuring the thermal load on the component, i.e. a sensor measuring the value of a quantity representative of the cooling requirement of the component to be cooled, the sensor measuring the thermal load on the component delivering a signal to the electronic control logic, said electronic control logic being programmed to decrease the cooling power produced by the cooling device to a relatively low level in response to a signal indicating a predetermined decrease in the thermal load on the component;

the sensor measuring the thermal load on the component comprises at least one of: a sensor for sensing temperature in a fluid circuit selectively ensuring heat exchange between the component and the working fluid; a pressure sensor; a means for measuring the electrical power supplied to the heaters; and a means for measuring the speed of cold compressors and/or turbines;

said buffer reserve of stored liquid being provided so as to be consumed by boiling by thermal exchange with the component during a plasma generation phase;

the variation in the cooling power produced by the cooling device being obtained by modifying the cycle pressure, i.e. the pressure level of the compression to which the working fluid is subjected during the working cycle and/or by modifying the cycle flow rate, i.e. the flow rate of working fluid through the working cycle; and the pressure and flow rate variations of the cycle are smoothed via the concomitant use of the control valve of a cold bypass, a room temperature storage tank, and the consumption of liquid helium in the tank.

The invention may also concern any alternative device or method comprising any combination of the features described above or below.

BRIEF DESCRIPTION OF THE FIGURES

Other particularities and advantages will become apparent on reading the following description, given with reference to the figures in which.

DETAILED DESCRIPTION OF THE INVENTION

The general operating principle will now be described with reference to FIG. 1.

Figure 1:
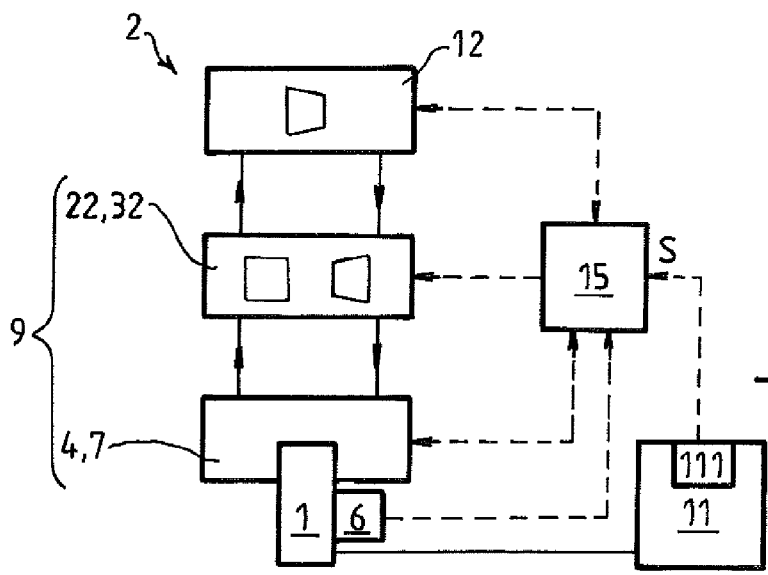
FIG. 1 is a partial schematic showing the structure and operation of a Tokamak refrigerator according to the invention.

The refrigerator schematized in FIG. 1 comprises, in the conventional way, a cooling device 2 comprising a circuit that subjects a working fluid to a working cycle so as to provide a cooling effect. For example, the working fluid comprises or consists of helium. For the sake of simplicity, this working fluid is called "helium" in the rest of the description.

The circuit of the cooling device 2 comprises a compressing station 12 equipped with at least one compressor 8, which compresses the helium. Once output from the compressing station 12 the helium enters a cooling unit 32 (optionally with a precooling unit 22). The cooling/precooling unit 22, 32 comprises one or more exchangers that exchange heat with the helium so as to cool the latter.

The cooling/precooling unit 22, 32 comprises one or more turbines for expanding the helium. Preferably, the cooling/precooling unit 22, 32 employs a Brayton cycle.

At least some of the helium is liquefied before being output from the cooling/precooling unit 22, 32 and a circuit 4, 7 is provided to ensure selective heat exchange between the liquid helium and a Tokomak component 1 to be cooled. The component 1 for example comprises a generator of magnetic fields obtained using a superconducting magnet, and/or one or more cryopumps.

The heat exchange circuit 4, 7 may for example comprise a tank 4 storing a reserve of liquefied helium and ducts 7 and one or more exchangers ensuring indirect heat exchange between the component 1 and the liquid helium.

At least some of the helium heated during heat exchange with the component 1 is returned to the compressing station. During the return to the compressing station 12, the helium may cool with exchangers, which in turn cool the helium output from the compressing station 12.

When a plasma is generated in the Tokamak 11, the component 1 is subjected to a higher thermal load (i.e. an increased cooling requirement). The cooling power of the cooling device 2 must therefore be increased.

The refrigerator possesses electronic logic 15 for controlling the cooling device 2, which especially allows the cooling power produced by said cooling device 2 to be regulated. In particular, the electronic logic 15 allows this cooling power to be rapidly increased to a relatively high level (for example to a level providing a maximum cooling effect) when the Tokamak 11 is in a plasma generation phase. Likewise, the electronic logic 15 controls the decrease of this cooling power to a relatively low level (for example to a preset minimum level) when the Tokamak 11 is no longer in a plasma generation phase.

The variation in the cooling power produced by the cooling device 2 is conventionally obtained by modifying the cycle pressure P, i.e. the pressure level of the compression 12 to which the helium is subjected during the working cycle.

The variation in the cooling power produced by the cooling device 2 may also be carried out, if required, by modifying the cycle flow rate, i.e. by modifying the flow rate of helium through the working cycle.

In contrast to the prior art, the increase in the cooling power of the device 2 of the refrigerator according to the invention is not triggered in response to information on the heating curve of a heater of the liquid helium reserve. According to the invention, this switch between a low-cooling-power operating mode and a high-cooling-power operating mode is anticipated relative to the relevant information on the heating curve of the heater.

In particular, in the refrigerator according to the invention, the Tokamak 11 comprises an emitter 112 for emitting a signal S when a plasma is being struck. This signal S is sent (by wire or wirelessly) to the electronic logic 15. For this purpose, the electronic logic 15 may comprise a receiver for receiving said signal S. When this signal S is received, the electronic logic 15 automatically requests the increase in the cooling power produced by the cooling device 2.

The signal S indicating that a plasma is being struck in the Tokamak is based on a physical parameter than can be observed in or upstream of the Tokamak 11 (and not downstream of the Tokamak 11 as was the case in the prior art).

For example, and without this being limiting, the physical parameter monitored so as to detect when a plasma phase has started may comprise at least one of: a threshold value for the internal temperature of the Tokamak; an electrical control signal; a manual control signal from an operator starting the Tokamak, or any other equivalent means; and a pressure and/or current and/or voltage and/or magnetic field measurement.

This advantageous feature allows the beginning of the plasma generation phase to be detected and makes it possible to make use of the time constant of the transfer of the thermal load between the core of the Tokamak (plasma generation region) and the thermal interface of the refrigerator (component 1 to be cooled). In this way, the refrigerator takes into account the inertia of the system in order to anticipate the increased cooling requirement before its effect on the component 1 is observed.

Thus, by virtue of the invention, the change in the cooling power regime occurs in such a way that the maximum power of the refrigerator is immediately available when the increased thermal load appears.

Preferably, the change in the cooling power (for example achieved by changing cycle pressures and/or flow rates) is not abrupt (not an all-or-nothing variation) but is gentle, for example the variation being at least partially smoothed.

Figure 3:
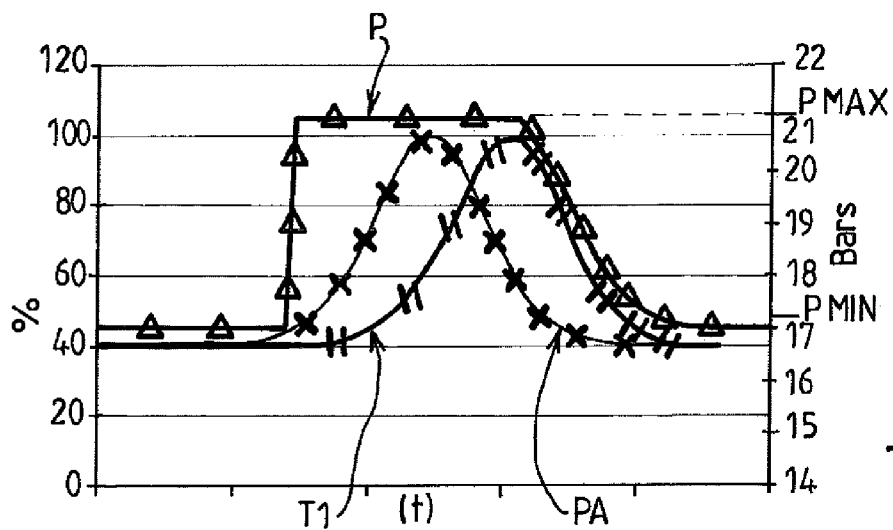
FIG. 3 shows, on the same graph, when a plasma PA is present, the variation a, as of function of time t, in the cycle pressure P and in the load T1 on a Tokamak component to be cooled.

FIG. 3 illustrates operation of this type: the increase in the cycle pressure P (to increase the cooling power of the device 2 the maximum pressure is set to setpoint PMAX) as a function of time "t" precedes the signal PA representing a plasma (peak of the curve PA). FIG. 3 also shows a curve T1 representing the variation in the thermal load that the component 1 applies to the liquid helium reserve 4, i.e. this load curve T1 represents the heat to be dissipated from the component 1. When the thermal load T1 applied by the component 1 again decreases, the pressure setpoint P may be reduced in an optimal way, preferably at the same rate as the load, until the low-pressure setpoint (minimum pressure) is reached.

In this operating mode, excess cooling power is provided for a short time before the effective increase in the thermal load. This excess thermal power may be regulated by a heater that vaporizes any excess liquid produced or via a cold bypass system that returns some of the helium from the cooling unit to the compressing station. Such a cold bypass system is, however, optional. Nevertheless, the variation in cycle pressure and flow rate is advantageously smoothed by the concomitant use of the cold bypass valve 30, of the room temperature storage tank, and of the consumption of liquid helium in the tank 4 (an exemplary operating mode of such a cold bypass is described in document WO2009/024705). This solution moreover makes it possible to prevent the normegligible power consumption of a heater, and to limit judiciously the amplitude of temperature variations in the cold unit.

Using the heater and/or a cold bypass makes it possible to use any excess cooling power to reduce the temperature of the heat exchangers of the cooling unit 32. This allows flow rate through the turbines of the stages of the cooling unit 32 to be reduced.

Figure 5:
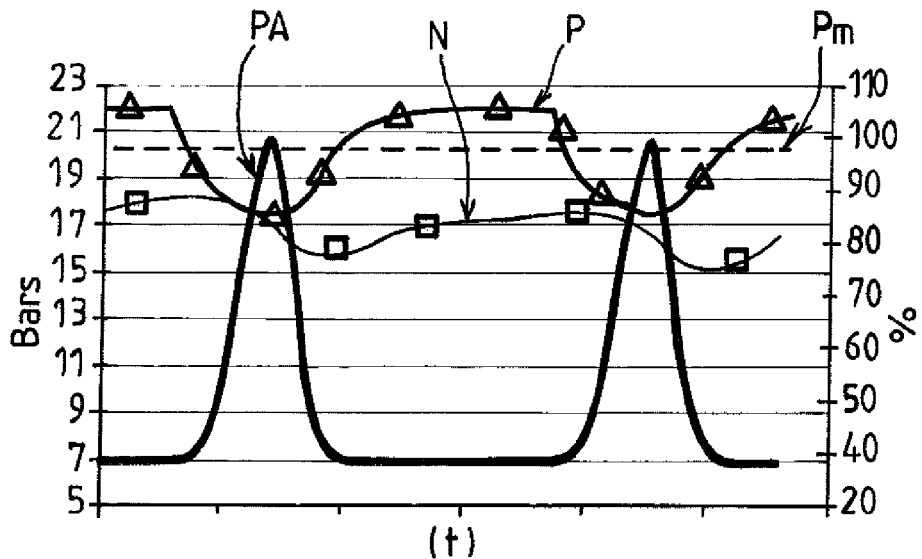
FIG. 5 shows, on the same graph, the variation t, as a function of time t, in the cycle pressure P, in the average cycle pressure Pm and in the liquid level N in the reserve of the refrigerator during two successive plasma phases PA for a prior-art refrigerator.
Figure 6:
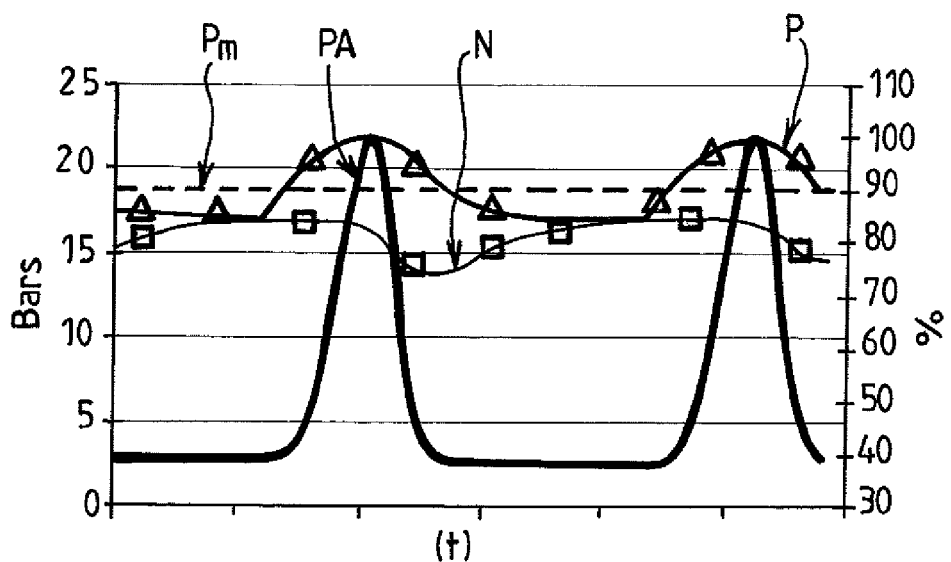
FIG. 6 shows, on the same graph, the variation, as a function of time, in the cycle pressure P, in the average cycle pressure Pm and in the liquid level N in the reserve of the refrigerator during two successive plasma phases PA for a refrigerator according to the invention.

FIGS. 5 and 6 demonstrate the advantages of the invention over the prior art.

Each figure shows, on a given graph, the variation, as a function of time t, in the cycle pressure P, in the average cycle pressure Pm and in the level N of liquid helium in the liquid reserve for a refrigerator subjected to two plasma phases in succession (two peaks in succession). FIG. 5 illustrates operation according to the prior art (the increase in the cycle pressure depending on variation in the heating curve of the heater). FIG. 6 illustrates operation according to the invention (the increase in the cycle pressure being in response to a signal S produced during a step of striking a plasma in the Tokamak).

Comparison of these curves illustrates that the invention allows the average operating pressure of the compressing station 12 of the refrigerator to be significantly reduced (by about 10%).

The invention thus reduces the overall power consumption of the refrigerator, progressively over a series of plasmas.

Thus, the inventors have observed that, in the prior art, when only the "heating curve" of the heater was used, changes in the cooling power regime of the device 2 were delayed relative to the thermal load due to a plasma. The invention makes it possible to improve the match between the cooling power of the device 2 and the cooling requirements. This is obtained while decreasing:
  the consumption of liquid helium (c.f. the liquid level N in FIGS. 5 and 6); and
  the power consumption of the compression station (c.f. above).

Figure 2:
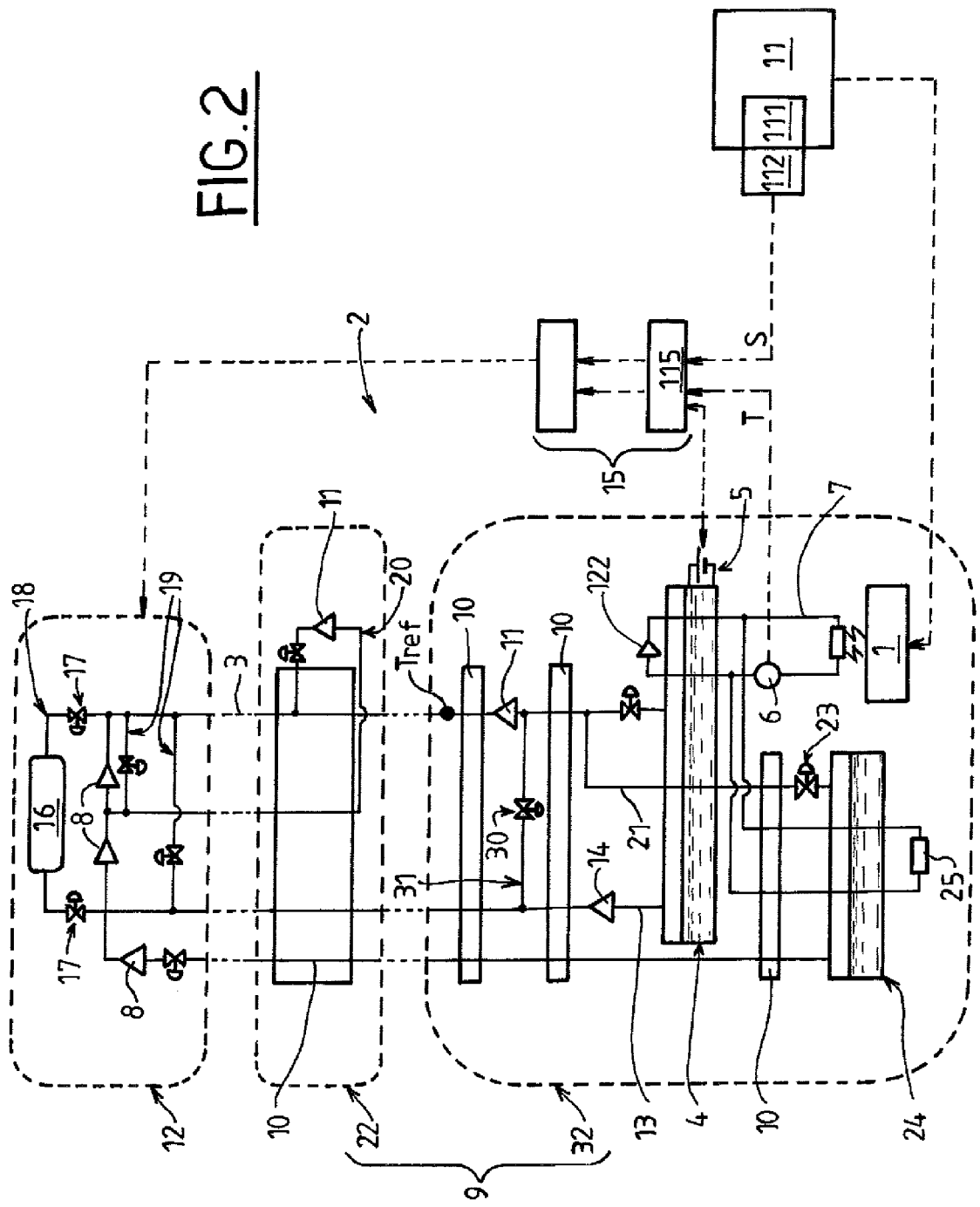
FIG. 2 is a partial schematic showing the structure and operation of a Tokamak refrigerator according to another embodiment of the invention.

FIG. 2 illustrates the application of the invention to a particular exemplary refrigerator 2 (nonlimiting example).

The compressing station 12 of the refrigerator in FIG. 2 comprises three compressors 8.

As shown, the compressing station 12 may comprise a duct 18 for diverting liquid hydrogen to a buffer storage tank 16. A system of valves 17 allows the transfer of helium between the working circuit and the buffer storage tank 16 to be regulated. Likewise, in the conventional way, ducts 19 equipped with respective valves may be provided so as to ensure selective return of compressed helium to certain compression stages.

After being output from the compressing station 12, the helium is admitted into a precooling unit 22 in which helium is cooled via heat exchange with one or more exchangers 10 and optionally expanded in turbines. A duct 20 equipped with a valve may be provided in order to selectively return helium to the compressing station 12.

The helium is then admitted into a cooling unit. The helium is cooled via heat exchange with one or more exchangers 10 and optionally expanded in one or more turbines 11. As explained above, a cold bypass duct 31 equipped with a valve 30 may be provided to return expanded helium to the compressing station 12.

The liquefied helium is mainly stored in a reserve 4. This reserve 4 of liquid helium forms a cold reserve intended to exchange heat with the component 1 to be cooled. The cooling occurs for example via a closed-loop circuit 7 equipped with a pump 122.

As shown, some of the liquefied helium may be diverted from upstream of the reserve 4 (bypass duct 21 and valve 23) in order to supply another tank forming an auxiliary reserve 24. The auxiliary reserve of liquid helium (which is optional) may be employed in a cryopump system 25 of the installation (or to cool any other thermal load). For example, the cooling circuit of the component 1 may comprise a circuit for diverting liquid helium to this other thermal load 25.

The heated helium output from reserves 4 and 24 is then returned to the compressing station 12. During its return the helium may be used to cool the exchangers 10 of the cooling and precooling units 32, 22.

The electronic logic 15 (which may comprise a microprocessor) is connected to the compressing station in order to regulate the cooling power. The electronic logic 15 is also connected to the heater of the reserve 4 in order to regulate the level of liquid helium in this reserve.

According to the invention, the Tokamak 11 comprises a sensor 111 that measures the value of a physical parameter that can be observed in the Tokamak 11 and that indicates when a plasma is being struck. Signals from the sensor 111 are relayed by an emitter 112 to a receiver 115 of the electronic logic 15. Advantageously, a temperature sensor 6 in the circuit 7 containing fluid flowing between the refrigerator and the component 1 also provides the electronic logic 15 with input. When the measured temperature T decreases (i.e. the cooling requirements decrease due to the plasma phase ending), the electronic logic 15 lowers the cooling power setpoint. Of course, the end of the plasma phase may be detected by any other means, for example via the heating curve of the heater 5, via a parameter measured in the Tokamak, or via other observables internal to the refrigerator such as for example cold compressor or turbine speeds. Specifically, if it is deliberately chosen not to regulate the speeds of the turbines, these speeds will naturally vary depending on the cooling required, and will therefore indicate the thermal load being applied to the liquid helium.

These two parameters (signal S, indicating that a plasma phase is starting, and temperature, after the plasma phase) may be used in a feedforward control scheme, i.e. at least one of:
  the pressure setpoint curve in the working cycle;
  the control curve of the frequency of an optional cycle variator (for controlling the helium flow rate in the working cycle); and
  the degree to which the cold bypass 30 is open,
  may be defined by a digital computer, for example integrated into the electronic logic 15. The digital computer may for example use a simple parameterizable arithmetic function or else an internal state prediction model to obtain finer regulation, with a view to optimizing power consumption.

Figure 4:
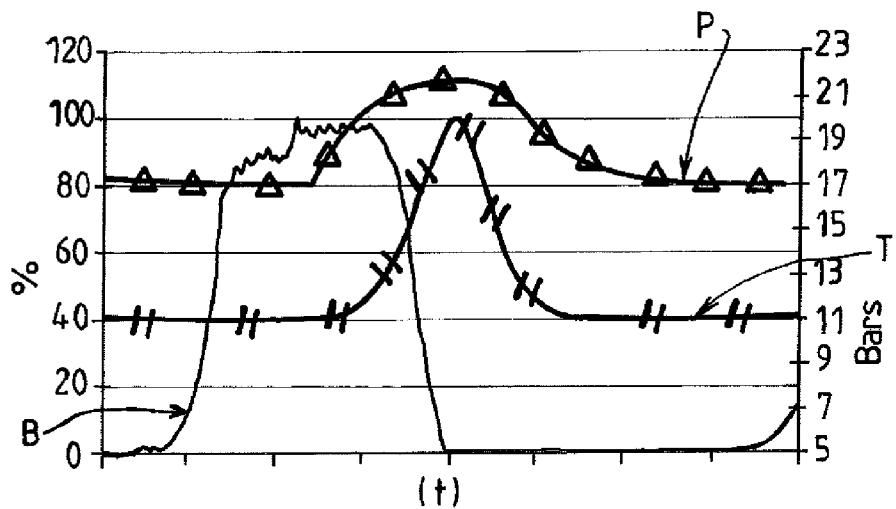
FIG. 4 shows, on the same graph, when a plasma PA is present, the variation, as a function of time t, in the cycle pressure P and in an optional cold bypass B of the refrigerator in FIG. 2.

FIG. 4 illustrates operation when the refrigerator possesses a cold bypass (see references 30, 31 in FIG. 2). When the signal indicating a plasma is being struck is received by the device 2, 15, the maximum pressure P setpoint is given to the compressing station 12. At this instant, the cooling device 2 is still in its reduced operating mode, and the cold bypass valve 30 is open (the reference temperature Tref increases, cf. the increase in the degree to which the valve is open, curve B).

The fact that the cold bypass is open limits the power of the refrigerator. The real pressure applied by the compressing station 12 and the resulting effects will depend on the digital control method used to regulate the compressing station. The regulation may use a predefined internal model, a "PID" control, or multivariable controls such as LQR controls, etc.

When the thermal load on the reserve 4 increases, the cold bypass valve 30 is closed. The temperature Tref of the bypass decreases so as to deliver maximum cooling power to the component 1.

Optimal regulation of the pressure is obtained. This results in a significant power saving.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A pulsed load method for cooling a component of a Tokamak, the method employing a cooling device that subjects a working fluid of helium to a working cycle, comprising the steps of:
   compressing the helium;
   cooling the helium;
   expanding the helium;
   cooling the component and heating the helium through heat exchange between the component and the expanded helium, wherein:
      the cooling power produced by the cooling device is increased to a relatively high level when the Tokamak is in a plasma generation phase;
      the cooling power produced by the cooling device is reduced to a relatively low level when the Tokamak is no longer in a plasma generation phase;
      the increase in the cooling power produced by the cooling device is automatically triggered in response to a signal generated during a step of starting a plasma in the Tokamak; and
   when the Tokamak is no longer in a plasma generation phase, the method comprises at least one period during which the cooling device liquefies working fluid and stores the liquefied fluid in a buffer reserve, the level of the liquefied fluid in the reserve being kept below a threshold by way of a heater that can be selectively activated, and in that, when a plasma phase is initiated, the cooling power produced by the cooling device is increased before the heater is deactivated and before the level of liquid in the reserve decreases whereby the signal indicating that a plasma is being struck in the Tokamak precedes deactivation of the heater and the drop in the level of liquid in the reserve resulting from fluid vaporization due to cooling of the component of the Tokamak during plasma generation.

2. The method of claim 1, wherein the signal is generated when there is a predetermined modification of a physical parameter that can be observed in the Tokamak.

3. The method of claim 1, wherein the signal is generated when there is a predetermined modification of at least one of the following physical parameters: a predetermined increase in the internal temperature of the Tokamak; a manual or automatic control signal for switching the Tokamak to a plasma generation phase; an electrical signal associated with a pressure and/or electrical current and/or voltage and/or magnetic field measurement; or a signal delivered by an optical measuring instrument such as a camera or one or more optical fibers.

4. The method of claim 1, wherein the decrease in the cooling power produced by the cooling device to a low level is automatically triggered in response to a predetermined variation in the thermal load on the component.

5. The method of claim 1, wherein the decrease in the cooling power produced by the cooling device is automatically triggered in response to at least one of: a signal indicating a predetermined temperature decrease in a fluid circuit ensuring heat exchange between the component and the working fluid; an increase in the level of liquid helium in a storage tank; an opening threshold of a cold bypass; a threshold speed of a compressor performing said step of compressing the helium; and/or a threshold speed of a turbine performing said step of expanding the helium.

6. The method of claim 1, wherein the increase or decrease in the cooling power produced is achieved by varying the level of at least one pressure cycle of the working fluid in the working cycle and/or by varying the rotation speed of compressors used in the working cycle.

7. The method of claim 1, wherein the increase or decrease in the cooling power produced is achieved by varying the electrical power consumed by the cooling device.

\* \* \* \* \*